United States Patent
Fukuda et al.

[11] 3,709,834
[45] Jan. 9, 1973

[54] METHOD OF MAKING A URANIUM CONTAINING CATALYST FOR A METAL ELECTRODE

[75] Inventors: Masataro Fukuda, Toyonaka-shi; Takashi Miura, Chigasaki-shi; Katsuhiro Takahashi, Hirakata-shi, all of Japan

[73] Assignee: Matsushita Electric Industrial Co., Ltd., Osaka, Japan

[22] Filed: Aug. 21, 1969

[21] Appl. No.: 851,943

[30] Foreign Application Priority Data

Aug. 26, 1968 Japan ..........................43/61551
May 23, 1969 Japan ..........................44/41253

[52] U.S. Cl.................252/470, 75/108, 136/120 FC
[51] Int. Cl. ...........................................B01j 11/08
[58] Field of Search...136/120 FC, 86; 252/465, 458, 252/470, 467, 301.1 R; 75/108, 122.5, 122.7; 23/329, 333, 334, 346, 336

[56] References Cited

UNITED STATES PATENTS

| | | | |
|---|---|---|---|
| 2,761,758 | 9/1956 | Long et al. | 23/329 |
| 3,288,717 | 11/1966 | Morse | 252/301.1 |
| 3,369,886 | 2/1968 | Metzger et al. | 136/120 FC |
| 2,669,598 | 2/1954 | Marko et al. | 136/120 |
| 3,208,883 | 9/1965 | Crouthamel | 136/86 |
| 3,248,214 | 4/1966 | Kroeger et al. | 136/120 X |
| 3,350,231 | 10/1967 | Hentz | 136/86 |
| 3,400,019 | 9/1968 | Le Duc | 136/86 |

Primary Examiner—Winston A. Douglas
Assistant Examiner—M. J. Andrews
Attorney—Stevens, Davis, Miller & Mosher

[57] ABSTRACT

An electrochemical electrode adapted for use in fuel cell batteries, metal-air batteries and electrochemical oxygen evolution instruments, and comprising an active catalyst which contains uranium and which in a small amount exhibits a catalytic activity equal to that obtainable from a larger amount of the conventional catalyst.

10 Claims, 9 Drawing Figures

PATENTED JAN 9 1973  3,709,834

M. FUKUDA, T. MIURA & K. TAKAHASHI
INVENTORS

BY Stevens, Davis, Miller & Mosher
ATTORNEYS

METHOD OF MAKING A URANIUM CONTAINING CATALYST FOR A METAL ELECTRODE

The present invention relates to improvements in the electrodes, particularly in the catalyst-incorporating electrodes used in such batteries as fuel cell batteries and metal-air batteries, electrochemical reaction instruments such as electrochemical oxygen evolution instruments, and sealed type storage batteries provided with a gas consuming auxiliary electrode; and has for its object the provision of a catalyst to be incorporated in the electrodes of the type mentioned above, which consists of one or a plurality of catalyst components with uranium added thereto and which has an excellent catalytic activity and is inexpensive as compared with the conventional ones.

With reference to the electrodes of fuel cell batteries, e.g., fuel electrodes, such as hydrogen electrode, hydrocarbon electrode and methanol electrode; oxidation electrodes, such as oxygen electrode, air electrode and hydrogen peroxide electrode; and the air electrodes of metal-air batteries, it has been customary to incorporate a catalyst therein for the purpose of promoting the electrochemical reaction in such electrodes and obtaining a practical current therefrom with the minimum degree of polarization. Namely, these electrodes do not have an active material per se but are supplied with fuel or oxidizing agent from the outside which correspond to the active material, like the electrodes of the ordinary primary batteries and secondary batteries. Therefore, in order to minimize the polarization during discharge of the batteries comprising such electrodes and to obtain a large discharge current density, the presence of a catalyst is essential.

In the electrochemical oxygen evolution instruments, an air electrode is polarized to be cathodic and a counter electrode, e.g., insoluble electrode of platinum or the like, is polarized to be anodic, whereby the oxygen in air is dissolved into the electrolyte from the air electrode and the oxygen generated in the instrument only is supplied to the other system. Therefore, the air electrode in the oxygen evolution instruments is of the same nature as the air electrodes used in the fuel cell batteries, and in order to obtain an instrument capable of supplying a large amount of oxygen, it is essential to incorporate a catalyst in the air electrode.

The sealed type storage batteries comprising a gas consuming auxiliary electrode are known as batteries in which use is made of an aqueous solution of acid or alkali as electrolyte, as in a lead-acid battery or a nickel-cadmium battery. In these batteries, any control circuit element, e.g., a non-linear resistor consisting of a sintered body of mainly ZnO or a diode, is provided between a positive electrode and/or a negative electrode, which are the main electrodes of the battery, and a catalyst-incorporating auxiliary electrode, and the hydrogen and/or oxygen generated mainly on overcharging of the battery is or are consumed over said auxiliary electrode through an electrochemical reaction, thus providing for operation of the battery in the sealed condition. This gas consuming auxiliary electrode normally has a portion thereof located in the gas phase of the battery and the remaining portion immersed in the electrolyte, and the gas consuming reaction essentially takes place in the vicinity of the interface between the gas phase and the liquid phase, so that the reaction area is variable. Therefore, the gas consuming auxiliary electrode is different in nature from the electrodes of the aforesaid fuel cell batteries in that the electrode is evaluated, not in terms of current density but rather in terms of maximum gas consuming current of the electrode in practical size. Nevertheless, such an auxiliary electrode also calls for an active catalyst, in order for said electrode to sufficiently consume the gases generated in the battery, and with this in view the prior art electrodes of this type have been provided with a catalyst which is active in the electrochemical reaction involving hydrogen or oxygen.

As described above, in the electrodes of fuel cell batteries, the air electrodes of metal-air batteries, the electrodes of electrochemical oxygen evolution instruments and the auxiliary electrodes of sealed storage batteries a catalyst which is effective in promoting the electrochmical reaction of the reactant involved has been one of the critical constituents of the electrode and many researches have been conducted relating to the type of catalyst and the method of incorporating said catalyst in the electrode, which are industrially acceptable from the standpoint of catalytic activity and cost.

These prior art catalysts are generally referred to as electrochemical catalysts and for which there have been used metals in the platinum group, such as platinum, palladium, rhodium, iridium, ruthenium and osmium; silver; nickel and metal oxides. Of these metallic catalysts, the metals in the platinum group have proved to be particularly excellent in catalytic activity in any case of the oxidation of fuel, the reduction of the oxidizing agent and the electrochemical reaction for the consumption of hydrogen or oxygen gas on the surface of the auxiliary electrodes of sealed storage batteries, or in either case when an acid or an alkali is used as electrolyte.

However, a great drawback of the platinum group metals is that they are extraordinarily expensive and, therefore, make the percentage cost of catalyst high with respect to the total cost of the electrode. It is for this reason that the electrodes incorporating such catalysts have not been widely used for practical applications. In order to obtain an effective catalytic activity with a small amount of platinum group metal, particularly of platinum, which has excellent catalytic activity as mentioned above, many composite catalysts have been proposed, e.g., co-precipitated catalysts, such as platinum-ruthenium catalyst and platinum-rhodium catalyst, and alloy catalysts. However, none of these catalysts are sufficiently satisfactory from both the cost and catalytic activity aspects, and there is a demand for a catalyst which is more active, but can yet be produced at a low costs.

The present invention is concerned with improvements in the electrodes which comprise a catalyst of the type described above.

Namely, according to the present invention a small amount of uranium is incorporated in the catalyst support used in an electrode, along with a catalyst, e.g., a platinum group metal, such as platinum, palladium, rhodium, iridium, rethenium or osmium, or a catalyst consisting of one or more metals, such as silver and nickel, which is active in the electrode reaction taking place on the electrode, whereby an electrode can be obtained which is highly active as compared with an electrode comprising the same catalyst in the same amount but not incorporating uranium. By adding a small amount of uranium, an effect similar to that obtainable by increasing the amount of catalyst used, can be obtained.

The present invention will be described by way of example hereunder with reference to the accompanying drawings, in which.

Figure 1:
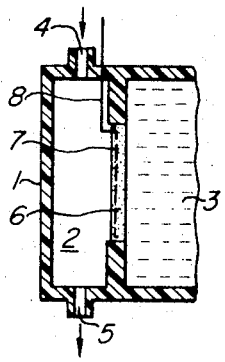
FIG. 1 is a fragmentary sectional view exemplifying the structure of the hydrogen electrode or oxygen electrode in fuel cell batteries.
Figure 2:
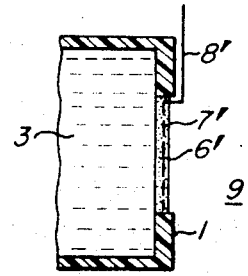
FIG. 2 is a fragmentary sectional view exemplifying the structure of the air electrode used in fuel cell batteries, metal-air batteries or electrochemical oxygen evolution instruments.
Figure 3:
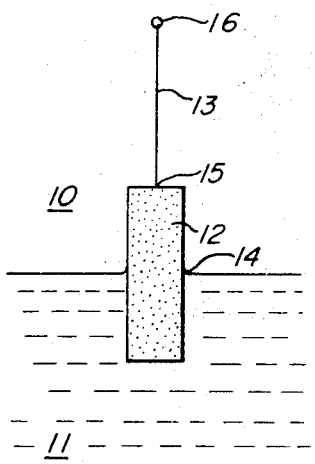
FIG. 3 is a sectional view showing a gas consuming auxiliary electrode used in sealed storage batteries.
Figure 4:
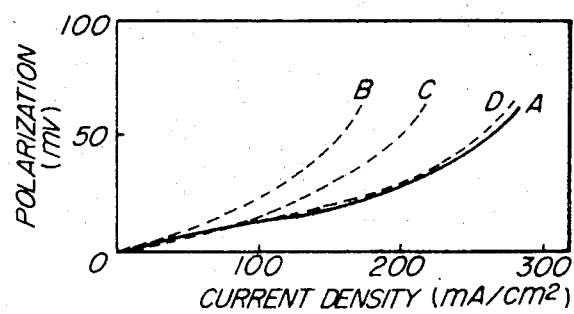
Figure 5:
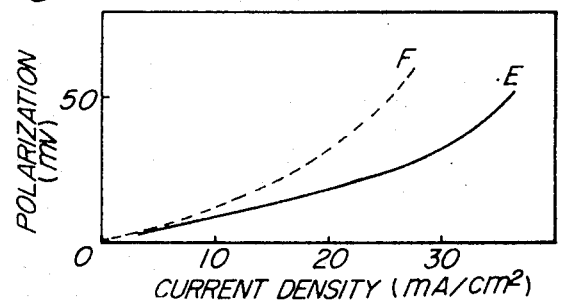
Figure 6:
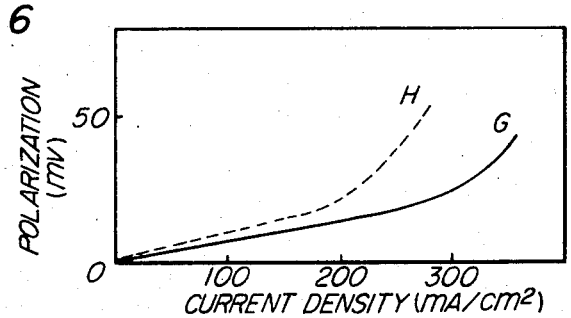
Figure 7:
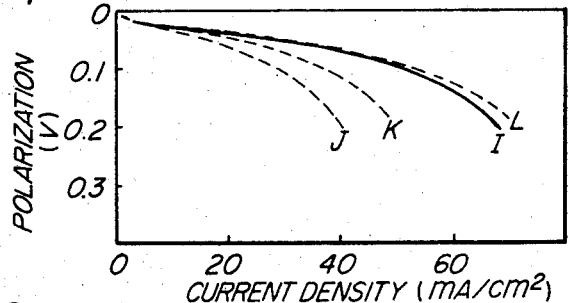
Figure 8:
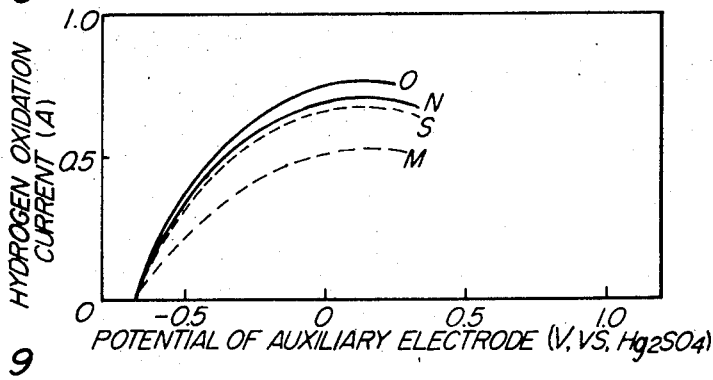
Figure 9:
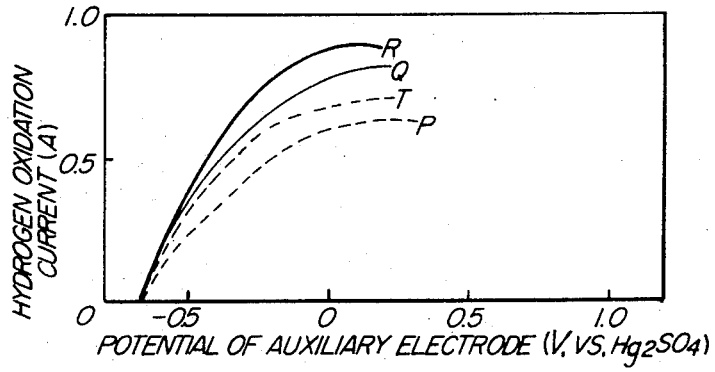

FIGS. 4, 5, and 6 are diagrams respectively showing the polarization characteristics of hydrogen electrodes of the structure shown in FIG. 1, incorporating different catalysts;

FIG. 7 is a diagram showing the polarization characteristics of air electrodes of the structure shown in FIG. 2, incorporating different catalysts; and FIGS. 8 and 9 are diagrams respectively showing the relationship between the hydrogen gas consuming current and the potential of hydrogen gas consuming electrodes of the structure shown in FIG. 3, incorporating different catalysts.

Referring first to FIGS. 1 and 2, reference numeral 1 designates a container, 2 a gas chamber, 3 an electrolyte, 4 a gas inlet port, 5 a gas outlet port, 6 and 6' a catalyst-incorporating electrode respectively, 7 and 7' a corrosion-proof metallic net constituting a collector respectively, 8 and 8' a terminal of the electrode respectively, and 9 air. A hydrogen-air fuel cell battery is obtained, for example, by using an aqueous solution of sulfuric acid or potassium hydroxide as electrolyte, introducing hydrogen gas into the gas chamber 2 and combining the electrodes 6 and 6' shown in FIGS. 1 and 2 respectively. A metal-air battery is obtained by combining the air electrode shown in FIG. 2 with a metallic electrode, e.g., a zinc electrode or a cadmium electrode, and further an electrochemical oxygen evolution instrument is obtained by using an air electrode of the structure, as shown in FIG. 2, as an oxygen dissolving electrode and combining it with an oxygen generating electrode.

FIG. 3 exemplifies the auxiliary electrode of a sealed storage battery, partially immersed in an electrolyte. In FIG. 3, reference numeral 10 designates a gas phase in the battery, 11 the electrolyte, 12 the gas consuming auxiliary electrode, 13 a lead of the auxiliary electrode, 14 the meniscus of the electrolyte in contact with the auxiliary electrode and 15 the junction between the lead 13 and the auxiliary electrode 12. An end 16 of the lead 13 is connected to a main electrode or electrodes of the battery, i.e., a positive electrode and/or a negative electrode through an element, e.g., a non-linear resistor consisting of a sintered body of essentially ZnO, or a semiconductor diode, which controls the potential of the auxiliary electrode to a level at which the highest gas consuming activity is obtained. The lead 13 is connected to the positive electrode if consumption of hydrogen gas is aimed, and to the negative electrode if consumption of oxygen gas is aimed.

The present inventors prepared catalyst by adding uranium to the conventional catalysts which are obtained by various known reduction methods, such as the reduction method with hydrogen, the reduction method with formalin, the reduction method with sodium borohydride and the reduction method with hydrazine, and each of which consists of one or more metals selected from the group consisting of platinum group metals, such as platinum, palladium, rhodium, iridium and ruthenium, silver, nickel, gold and copper; and evaluated the catalysts individually by incorporating them in the electrode of a hydrogen-air fuel cell battery and auxiliary electrode of a sealed storage battery. As a result, it was found that the addition of uranium is effective in promoting the catalytic activity of the basic catalyst, regardless of the type of the basic catalyst, the reduction method employed for the preparation of said basic catalyst and the electrolyte being sulfuric acid or caustic potash. A particularly excellent electrode characteristic was obtained when uranium was added to a platinum catalyst or a platinum-ruthenium catalyst. In exemplifying the effect of the present invention, therefore, reference is made to the hydrogen electrode and the air electrode of a hydrogen-air fuel cell battery and the hydrogen gas consuming auxiliary electrode of a sealed storage battery, using an aqueous solution of sulfuric acid as electrolyte, in which a platinum catalyst and a platinum-ruthenium catalyst having uranium added thereto are incorporated respectively.

First of all, the effect of the present invention on the hydrogen electrode and oxygen electrode will be described.

The electrodes 6 and 6' were produced in the following manner: In incorporating the catalyst, chloroplatinic acid was used as a source of platinum, ruthenium chloride as a source of ruthenium and uranyl nitrate as a source of uranium. These source materials were dissolved in water individually and the resultant aqueous solutions were mixed according to a desired composition. Thereafter, the mixture was impregnated in carbon powder and reduced. The reduction was effected by the known method using sodium borohydride. Namely, a sufficient amount of sodium borohydride was dissolved in water immediately before the reduction and the resultant aqueous solution was added to the aforesaid carbon power impregnated with the mixed solution of the salts. Upon completion of the reduction, 25 percent by weight of a fluorocarbon resin powder was added and the mixture was molded into a shape. The shaped body was then subjected to a heat treatment in a nitrogen stream. In molding the mixture under pressure, a corrosion-proof metallic net 7 or 7' was embedded in the mixture as a collector. Incidentally, all the catalysts used in this experiment were produced under the same conditions with respect to molding pressure, heat treatment temperature and heat treatment time, except for the composition of the catalysts, since the object of the experiment was to compare the catalytic activities of the respective catalyst with each other.

As a source of uranium, uranium bromide, uranium chloride, uranium oxalate, uranium acetate and the like may also be used depending upon the conditions of use. However, uranium chloride and uranium acetate have the disadvantage of being susceptible to decomposition in water, while uranium oxalate has the disadvantage that it cannot be added in a large amount because of its low solubility. The most remarkable effect of promoting the catalytic activity of catalyst by the addition of uranium was observed when uranium nitrate was used. Therefore, in the experiment described herein, use was made of uranium nitrate as a source of uranium.

The effect of adding uranium is observed when the catalyst previously obtained by reducing the mixed aqueous solution of component salts is mixed with a powdery support, but a higher effect can be obtained by reducing the component salts after impregnating the powdery support with the mixed aqueous solution of said salts as described above.

For incorporating the uranium-containing catalyst in the electrode, there can be used a method wherein the catalyst obtained by reducing a mixed powder or solution of the catalyst metal and uranium compounds is mixed with a powdery support, a method wherein the mixed powder or solution of the catalyst metal and uranium compounds is reduced after mixing or impregnating it with or in the powdery support, or a method wherein the mixed solution of the catalyst metal and uranium compounds is reduced after impregnating it in a sintered body of the catalyst support, and in any method described above water, ethanol and the like may be used as a solvent for said compounds. When hydrogen is used for the reduction, the mixture of the catalyst metal and uranium compounds must be in a dry or semi-dry state, since the reduction cannot be effected in a solution. The present inventors tested the methods described above and found that, although the effect of promoting the catalytic activity of the catalyst by the addition of uranium is obtained by any method, the catalytic activity of the electrode per se is best when the catalyst is incorporated in the electrode by the method wherein a mixed aqueous solution of the catalyst metal and uranium compounds is reduced after impregnating it in a powdery support. In the experiment described herein, the electrodes were produced by such method.

As regards the reduction method, any one of the previously stated methods can be used to obtain the catalytic activity promoting effect of uranium. However, it is to be noted that the catalytic activity of the catalyst obtained by carrying out the reduction using a strong reducing agent, such as formalin and sodium borohydride, is higher than that obtained by carrying out the reduction using the other reducing agent, such as hydrogen and hydrazine, and that of the former reducing agents, the use of sodium borohydride produces a better result than the use of formalin, though only slightly.

The catalytic activities of the electrodes produced in the manner described above were evaluated as follows: The hydrogen electrodes was mounted as shown in FIG. 1 and hydrogen gas was maintained in the gas chamber 2 at a pressure of 5 mm. water column relative to the atmospheric pressure, whereas the air electrode was mounted as shown in FIG. 2. 5 mol/$l$ of an aqueous solution of sulfuric acid was used as the electrolyte 3 and a platinum electrode was used as a counter electrode. The polarization characteristics of the respective electrodes were obtained by measuring the potential differences between a mercurous sulfate electrode and the respective sample electrodes.

Now, the effect of uranium added to the catalysts, evaluated by the above-described method, will be explained in detail hereunder: A Table below shows the compositions of the catalysts, the polarization characteristics of which will be discussed later. The numerals shown in the Table are percentages by weight of the component metals of the respective catalysts, calculated with respect to the electrode.

|   | Pt  | Ru  | U    |
|---|-----|-----|------|
| A | 1   | 0   | 0.2  |
| B | 1   | 0   | 0    |
| C | 2   | 0   | 0    |
| D | 5   | 0   | 0    |
| E | 0.1 | 0   | 0.03 |
| F | 0.1 | 0   | 0    |
| G | 0.7 | 0.3 | 0.3  |
| H | 0.7 | 0.3 | 0    |
| I | 1   | 0   | 0.2  |
| J | 1   | 0   | 0    |
| K | 2   | 0   | 0    |
| L | 5   | 0   | 0    |
| M | 1   | 0   | 0    |
| N | 1   | 0   | 0.2  |
| O | 1   | 0   | 0.5  |
| P | 0.7 | 0.3 | 0    |
| Q | 0.7 | 0.3 | 0.2  |
| R | 0.7 | 0.3 | 0.4  |
| S | 3   | 0   | 0    |
| T | 1.4 | 0.6 | 0    |

FIG. 4 shows the polarization characteristics of the electrode A, obtained by the co-precipitation of 1 percent of platinum and 0.2 percent of uranium, in the hydrogen oxidation reaction in the aqueous solution of sulfuric acid, and in order that the effect of adding uranium may be clearly understood, the polarization characteristics of the electrode B incorporating 1 percent of platinum and no uranium, the electrode C incorporating 2 percent of platinum and no uranium, and the electrode D incorporating 5 percent of platinum and no uranium are also shown in the diagram. As may be apparent, the polarization of the electrode A is smaller than the that of the electrode B incorporating the same amount of platinum, and it should be noted in particular that the electrode A shows a performance close to that of the electrode D at a large current density. Namely, by the addition of uranium an electrode performance which could not obtained in the past unless the amount of platinum is increased, can be obtained with a smaller amount of platinum in the electrode. A similar effect can be obtained when the ratio of platinum is varied. For instance, the polarization characteristics of the electrode E, obtained by the co-precipitation of 0.1 percent of platinum and 0.03 percent of uranium, in the electrochemical reaction of oxidizing hydrogen in sulfuric acid, is superior to that of the electrode F, comprising the same amount of platinum but no uranium, as will be seen in FIG. 5.

Uranium is effectively added to catalysts of platinum group metals in an amount from 0.01 to 1 part by weight per 1 part of the catalyst, most preferably from 0.05 to 0.7 part by weight per 1 part of the latter.

Referring to FIG. 6, there is shown the polarization characteristics of the electrode G comprising 0.7 percent of platinum, 0.3 percent of ruthenium and 0.3 percent of uranium, as used in an aqueous solution of sulfuric acid as hydrogen electrode. Similar to FIGS. 4 and 5, the diagram of FIG. 6 shows that the electrode containing uranium is superior to the electrode H containing no uranium, in respect of catalytic activity.

The polarization characteristics of an electrode, obtained in the same manner as the electrode A shown in FIG. 4, when used as the air electrode of FIG. 2 in a 5 mol/l sulfuric acid, is shown in FIG. 7. As seen, the electrode I comprising 1 percent of platinum and 0.2 percent of uranium shows better polarization characteristics than those of the electrode J comprising 1 percent of platinum only and the electrode K comprising 2 percent of platinum only, in respect of the reduction of oxygen in air, like in case of the electrode being used as hydrogen electrode; and is substantially as good as the polarization characteristics of the electrode L which comprises about 5 percent of platinum but no uranium.

Next, the advantage of the present invention will be further described with reference to an example in which the invention is applied to the gas consuming auxiliary electrode of a sealed storage battery. The catalyst in this example was also produced using chloroplatinic acid as a source of platinum, ruthenium chloride as a source of ruthenium and uranyl nitrate as a source of uranium. These chlorides and uranyl nitrate were individually dissolved in water and the resultant solutions were mixed according to a desired composition of the catalyst. The mixed solution was impregnated in a carbon powder and reduced. Namely, the reduction was effected by charging the carbon powder, impregnated with the mixed solution, in a caustic soda solution at high concentration and adding thereto an amount of 37 percent aqueous solution of formaldehyde sufficient for the reduction of the catalyst. After the reduction, the catalyst was sufficiently washed with water, dried and ground and then a fluorocarbon resin powder was mixed with the catalyst in such an amount that the weight of the fluorocarbon resin becomes 20 percent of the total weight of the product electrode. Thereafter, the mixed powder was molded into an electrode and the molded electrode was subjected to heat treatment. In the manner described above, electrodes respectively comprising the aforesaid catalysts of different compositions were produced under the same conditions of molding pressure, heat treatment temperature and heat treatment time, for the purpose of comparison in catalytic activity.

An electrode of 28 × 3 × 3 mm. in size was cut out of the aforesaid shaped body and was immersed a half of its length of 28 mm. in sulfuric acid having a specific gravity of 1.20. Using a platinum electrode as the counter electrode and a mercurous sulfate electrode as a reference electrode, the above-described sample electrode was subjected to a potential sweep in a hydrogen stream, the results of which are shown in FIGS. 8 and 9. In measuring the hydrogen oxidation current, a voltage drop caused by the resistance in the proximity of the meniscus or a portion above the point 14 in FIG. 3, where the reaction takes place, was omitted. The potential sweep rate was 30 sec/V.

These results will be explained in detail hereunder with reference to FIGS. 8 and 9. In FIG. 8 there is shown the current-potential curves of the electrode N comprising 1 percent of platinum and 0.2 percent of uranium, and the electrode O comprising 1 percent of platinum and 0.5 percent of uranium. In order to make clear the effect of adding uranium, the current-potential curves of the electrode M comprising 1 percent of platinum only and no uranium, and the electrode S comprising 3 percent of platinum only and no uranium, are also plotted in FIG. 8 for comparison. From the diagram, it will be clearly understood that the electrode N has a higher limiting current than that of the electrode M comprising the same amount of platinum but no uranium added thereto, and shows a performance substantially equal to that of the electrode S which comprises platinum in an amount three as large as that contained in said electrode N; and that the electrode O which has 0.5 percent of uranium added thereto with respect to the amount of platinum shows a further improved performance.

FIG. 9 shows the current-potential curves of the electrode Q comprising 0.7 percent of platinum, 0.3 percent of ruthenium and 0.2 percent of uranium, and the electrode R comprising 0.7 percent of platinum, 0.3 percent of ruthenium and 0.4 percent of uranium, when said electrodes were used as auxiliary electrode respectively. Again, in order to make clear the effect of uranium contained in the respective electrodes, the current-potential curves of the electrode P comprising the same amount of catalyst, i.e., 0.7 percent of platinum and 0.3 percent of ruthenium, and the electrode T comprising an amount of catalyst twice as large as that contained in the electrodes Q and R, i.e., 1.4 percent of platinum and 0.6 percent of ruthenium, are plotted in FIG. 9 for comparison. The diagram of FIG. 9 clearly shows that the electrodes Q and R have a higher limiting current with respect to the consumption of hydrogen that of the electrode P which comprises the same amount of catalyst but no uranium added thereto; that the limiting current of the electrode Q is even higher than that of the electrode T comprising amounts of platinum and ruthenium twice as large as those contained in said electrode Q; and that the electrode R has a still higher limiting current.

In the present invention, it has also been confirmed that the addition of uranium is effective for the reduction of oxygen.

The electrodes comprising uranium, when used as gas electrodes after having been subjected to a suitable water-repelling treatment, have such an advantage over the uranium-less electrodes that the performance rise is quick and a high performance can be obtained from the outset of the operation.

It is to be understood that the above-described effect of adding uranium can similarly be obtained when the electrodes comprise a catalyst of other than platinum and platinum-ruthenium or when an alkali is used as electrolyte. The catalysts other than those mentioned in the experiments described herein, to which the present invention is applicable, include unitary catalysts of metals of the platinum group, such as of palladium, rhodium, iridium, ruthenium and osmium; and binary and ternary catalysts comprising at least a metal of the platinum group, such as platinum-palladium catalysts, platinum-rhodium catalyst, platinum-iridium catalyst, platinum-osmium catalyst, platinum-gold catalyst, palladium-gold catalyst, rhodium-copper catalyst, platinum-palladium-ruthenium catalyst, platinum-rhodium-ruthenium catalyst, platinum-iridium-ruthenium catalyst and platinum-osmium-ruthenium catalyst.

The reason why uranium brings about the effect set forth above is not clearly understood. However, in the light of the fact that the addition of uranium is effective in a wide range of reactions as described above, it is presumed that uranium provides a condition favorable to the activity of the catalyst proper. For instance, when the starting material of a catalyst is reduced with formalin or sodium borohydride, the resultant catalyst particles settle on the bottom of the container almost entirely in a short period of time after completion of the reduction, if no uranium is present; whereas catalyst particle becomes so fine as will not completely settle even upon being left to stand for overnight are formed, if uranium is present. On the other hand, with uranium alone used, the particle settles simply in the form of a colloid.

From these facts, it is considered that the presence of uranium contributes to the formation of the reduced metal particles in an extremely small particle size and these fine particles are maintained in a hardly agglomerating state relative to each other. The catalyst carried on the catalyst support in such a condition probably accounts for the effect of uranium described herein. Since, according to the present invention, the catalytic activity of the catalyst proper is essentially promoted, the principle of the invention can also be applied to electrodes which call for a similar catalyst, e.g. the electrodes used in the electrochemical oxidation of methanol and hydrocarbons and the electrodes used in the reduction of hydrogen peroxide.

As will be understood from the foregoing description, the present invention enables the performance of catalyst-incorporating electrodes to be improved drastically and, by simultaneously incorporating the catalyst and uranium according to the invention, it is possible to obtain an electrode having such an excellent performance which has not been obtainable unless the amount of catalyst is increased.

What is claimed is:

1. A process for producing a catalyst for use in electrodes of electrochemical devices, comprising reducing a mixed solution of a uranium compound and an active catalyst metal compound by means of a chemical reducing agent selected from the group consisting of sodium borohydride, formalin and hydrazine to produce a uranium-containing active catalyst metal.

2. A process according to claim 1, wherein said uranium compound is uranyl nitrate.

3. A process according to claim 1, wherein said active catalyst metal is a single catalyst metal consisting of a metal of the platinum group.

4. A process according to claim 1, wherein said active catalyst metal is a composite catalyst metal containing at least one member selected from metals of the platinum group.

5. A process according to claim 1, wherein the amounts of said uranium compound and said active catalyst metal compound are so selected that the amount of uranium is 0.01 to 1 part by weight per 1 part by weight of the catalyst metal.

6. A process for producing a catalyst for use in electrodes of electrochemical devices, comprising immersing a catalyst support into a mixed solution of uranium compound and an active catalyst metal compound, and then reducing the compounds on said catalyst support with a chemical reducing agent selected from the group consisting of sodium borohydride, formalin and hydrazine in order to produce on said catalyst support a uranium-containing active catalyst metal.

7. A process according to claim 6, wherein said uranium compound is uranyl nitrate.

8. A process according to claim 6, wherein said active catalyst metal is a single catalyst metal consisting of a metal of the platinum group.

9. A process according to claim 6, wherein said active catalyst metal is a composite catalyst metal containing at least one member selected from metals of the platinum group.

10. A process according to claim 6, wherein the amounts of said uranium compound and said active catalyst metal compound are so selected that the amount of uranium is 0.01 to 1 part by weight per 1 part by weight of the catalyst metal.

* * * * *